(12) United States Patent
Gorin et al.

(10) Patent No.: US 8,650,033 B1
(45) Date of Patent: *Feb. 11, 2014

(54) METHOD OF ACTIVE LEARNING FOR AUTOMATIC SPEECH RECOGNITION

(75) Inventors: Allen Louis Gorin, Berkeley Heights, NJ (US); Dilek Z. Hakkani-Tur, Castro Valley, CA (US); Giuseppe Riccardi, Hoboken, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 957 days.

This patent is subject to a terminal disclaimer.

(21) Appl. No.: 11/549,395

(22) Filed: Oct. 13, 2006

Related U.S. Application Data

(63) Continuation of application No. 10/329,139, filed on Dec. 24, 2002, now Pat. No. 7,149,687.

(60) Provisional application No. 60/399,311, filed on Jul. 29, 2002.

(51) Int. Cl.
*G10L 15/06* (2013.01)
(52) U.S. Cl.
USPC .................................................. 704/243
(58) Field of Classification Search
USPC ................... 704/231, 235, 240, 243, 251
See application file for complete search history.

(56) References Cited

PUBLICATIONS

Thompson et al. "Active Learning for Natural Language Parsing and Information Extraction", Proc. of 16th Intern. Machine Learning Conf., pp. 406-414, Jun. 1999.*
Roberto Gretter and Giuseppe Riccardi, "On-Line Learning of Language Models with Word Error Probability Distributions," in Proc. of the IEEE International Conference on Acoustics, Speech and Signal Processing, 2001.*

* cited by examiner

*Primary Examiner* — Angela A Armstrong

(57) ABSTRACT

State-of-the-art speech recognition systems are trained using transcribed utterances, preparation of which is labor-intensive and time-consuming. The present invention is an iterative method for reducing the transcription effort for training in automatic speech recognition (ASR). Active learning aims at reducing the number of training examples to be labeled by automatically processing the unlabeled examples and then selecting the most informative ones with respect to a given cost function for a human to label. The method comprises automatically estimating a confidence score for each word of the utterance and exploiting the lattice output of a speech recognizer, which was trained on a small set of transcribed data. An utterance confidence score is computed based on these word confidence scores; then the utterances are selectively sampled to be transcribed using the utterance confidence scores.

15 Claims, 4 Drawing Sheets

METHOD OF ACTIVE LEARNING FOR AUTOMATIC SPEECH RECOGNITION

PRIORITY APPLICATION

The present application is a continuation of U.S. patent application Ser. No. 10/329,139, filed Dec. 24, 2002, which claims priority to U.S. Provisional Patent Application No. 60/399,311, filed Jul. 29, 2002, the contents of which are incorporated herein by reference.

BACKGROUND OF THE INVENTION

1. Field of the Invention

The present disclosure relates to automatic speech recognition (ASR) and more specifically to an iterative method of active learning for reducing the transcription effort for training in ASR.

2. Discussion of Related Art

State-of-the-art speech recognition systems require transcribed utterances for training, and transcription is a labor-intensive and time-consuming process. The search for effective training data sampling algorithms, in order to have better systems with less annotated data by giving the system some control over the inputs on which it trains, has been studied under the title of "active learning." Previous work in active learning has concentrated on two approaches: certainty-based methods and committee-based methods. In the certainty-based methods, an initial system is trained using a small set of annotated examples. Then, the system examines and labels the un-annotated examples and determines the certainties of its predictions of them. The "k" examples with the lowest certainties are then presented to the labelers for annotation. In the committee-based methods, a distinct set of classifiers is also created using the small set of annotated examples. The un-annotated instances, whose annotations differ most when presented to different classifiers, are presented to the labelers for annotation. In both paradigms, a new system is trained using the new set of annotated examples, and this process is repeated until the system performance converges to a limit.

In the language-processing framework, certainty-based methods have been used for natural language parsing and information extraction. Similar sampling strategies were examined for text categorization, not to reduce the transcription cost but to reduce the training time by using less training data. While there is a wide literature on confidence score computation in ASR, few if any of these works address the active learning question for speech recognition.

SUMMARY OF THE INVENTION

What is needed in the art is an improved method that reduces the transcription effort for training an ASR component. Such an ASR component may be used in a variety of applications including, but not limited to, spoken dialog systems. The preferred embodiment of the disclosure is an iterative method for reducing the effort for training the ASR component comprising (1) pre-processing unlabeled examples of transcribed utterances using a computer device, (2) using a lattice output from a speech recognizer, automatically estimating a confidence score for each word associated with selected examples, (3) computing utterance confidence scores based on the estimated confidence score for each word, (4) selecting utterances to be transcribed using the utterance confidence scores; and (5) iteratively performing steps of the process until a word error rate converges.

Additional features and advantages of the disclosure will be set forth in the description which follows, and in part will be obvious from the description, or may be learned by practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth herein.

BRIEF DESCRIPTION OF THE DRAWINGS

In order to describe the manner in which the above-recited and other advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION OF THE INVENTION

Active learning aims at reducing the number of training examples to be labeled by inspecting the unlabeled examples and intelligently selecting the most informative ones with respect to a given cost function for a human to label. The goal of the learning algorithm is to select the examples for labeling which will have the largest improvement on the performance. Therefore, it is an object of the present disclosure to reduce the manual transcription effort for training in ASR. Using the method disclosed herein, the inventors have realized a reduction of the amount of transcribed words needed for a given word accuracy by 27%.

In one aspect of the disclosure, a method for reducing the transcription effort for training in ASR comprises selectively sampling a subset of data. The method is preferably practiced by a computer device as is known by those of skill in the art. The computer device is programmed to perform the steps of the method as described herein. Any programming language may be used and the particular language is immaterial to the present disclosure.

The computer device programmed to operate the inventive method automatically labels each word of an utterance with a confidence score, exploiting the lattice output of a speech recognizer which was initially trained on a small set of transcribed data. The computer device computes utterance confidence scores from the word-based confidence scores, and selectively samples the utterances to be transcribed using these scores. The process of the present disclosure is independent of the way confidence scores are computed. Any means of computing confidence scores that are correct or close to the truth may be used.

Most spoken dialog systems are developed for a specific domain, such as the travel industry, or to help with telephone billing or long distance telephone services. Transcription is an important procedure both for extending the system to many domains and for incorporating new call-types into an existing system. Since transcription capability is limited, selective sampling over the terabytes of a speech database is crucial.

The present disclosure utilizes technology from the machine learning domain, as well as related work in language processing. According to an aspect of the disclosure, the computer device selects for transcription the examples that are mis-recognized by the speech recognizer. The computer device eliminates those that the speech recognizer has recognized correctly.

In order to practice the present disclosure, a speech recognizer must first be trained using a small set of transcribed data $S_t$. Using the recognizer, the computer device recognizes the utterances that are candidates for transcription $S_u$, where $S_u$ is an additional un-transcribed set. Using the lattice-based confidence measures, the computer device predicts which candidates are recognized incorrectly. The human transcriber transcribes the utterances that are most likely to have recognition errors.

Figure 1:
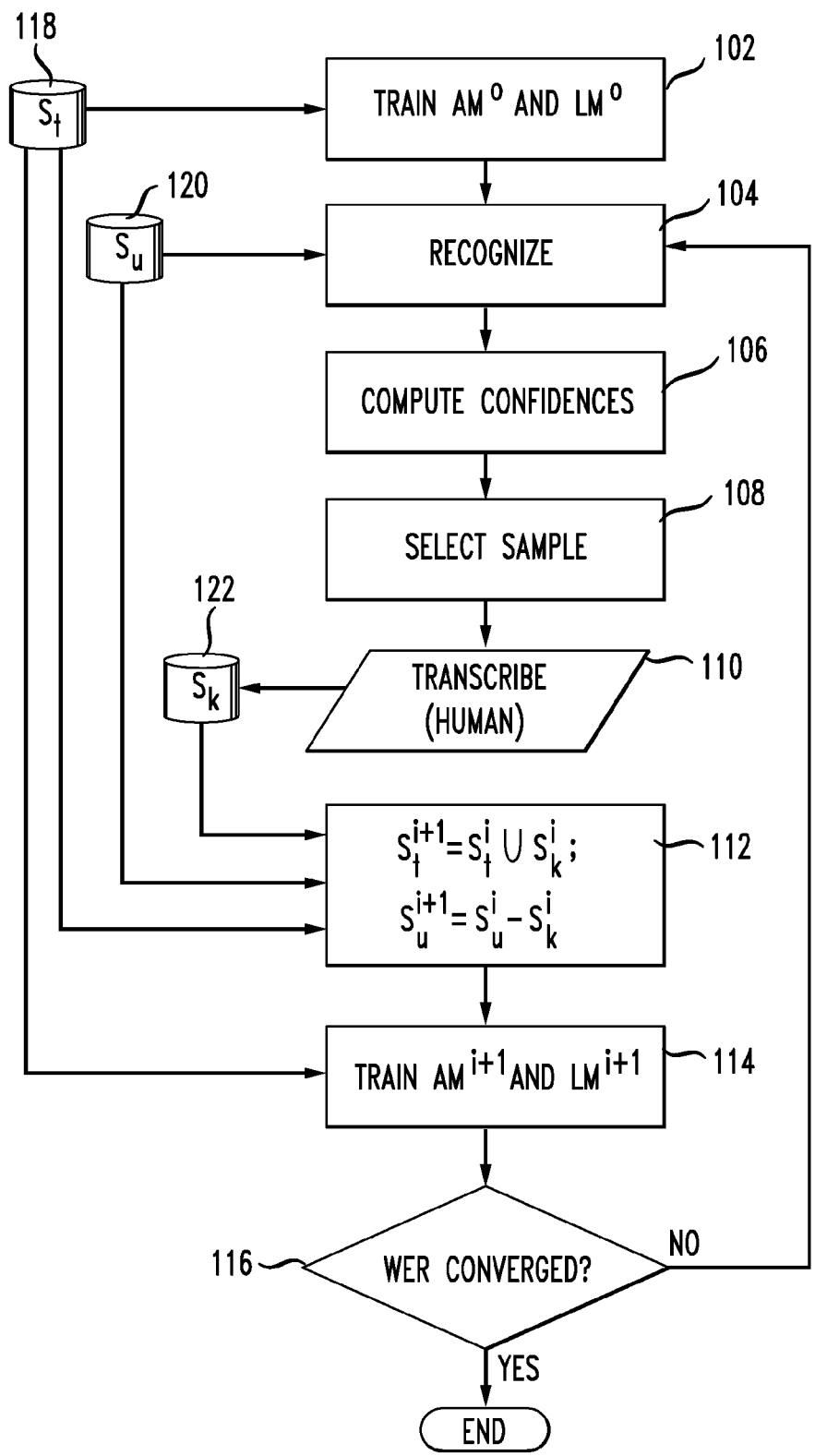
FIG. 1 illustrates an exemplary method of the present disclosure.

A preferred example of the method is shown in FIG. 1. The method comprises training the initial acoustic and language models $AM_i$ and $LM_i$ for recognition using $S_t$ (102). The variable "i" is the iteration number, and as shown in step 102, i=0 for the initially trained acoustic and language models. Next, the method comprises recognizing the utterances in set $S_u$ using $AM_i$ and $LM_i$ (104), computing the confidence scores for all the words or un-transcribed utterances (106), selecting k utterances which have the smallest confidence scores from $S_u$ (108), and transcribing them (110). The additional un-transcribed set $S_u$ (120) is made available to step 104 and set 112. The initial transcribed set $S_t$ (118) is made available to the training step 102, recalculation step 112 and training step 114 as set forth below. Step 110 involves some human intervention to transcribe the selected utterances. An intermediate set of utterances to be transcribed is referred to as $S_k$ (122). Next, the set $S_t^{i+1}$ is defined as $S_t^i$ united with $S_k^i$. $S_u^{i+1}$ is redefined as $S_u^i - S_k^i$ (112).

The method comprises retraining the improved acoustic and training models $AM^{i+1}$ and $LM^{i+1}$ (114) derived from the earlier steps of the method. The method further comprises determining whether word error rate (WER) accuracy has converged (116). If not, then the method returns to step (104). If word accuracy has converged, then the method ends. This iterative approach within the process provides a valuable component to reducing the human interaction necessary to obtain the transcribed utterances for ASR.

In order to make better decisions in the future selections with respect to the labeling cost, k should be one. However, for efficiency reasons in retraining, it is usually set higher.

There are two known methods for confidence score estimation. The first one is based on acoustic measurements and the other one is based on word lattices. The latter one has the advantage that the probability computation does not require training of an estimator. There are also approaches that use features from the two types of methods.

The inventors' preferable solution is to use Mangu et al.'s algorithm to compute confusion networks (sausages) from the lattice output of a speech recognizer and to use the word posterior probability estimates on the sausages as word confidence scores. See L. Mangu, E. Brill, and A. Stolcke, "Finding consensus in speech recognition: word error minimization and other applications of confusion networks," *Computer Speech and Language*, Vol. 14, No. 4, pp. 373-400 (2000), incorporated herein by reference. A sausage is a compact representation that specifies the sequence of words for these models. Lattices and sausages are generated for additional training data, and the confidence scores for words and utterances are computed as described below.

Figure 2:
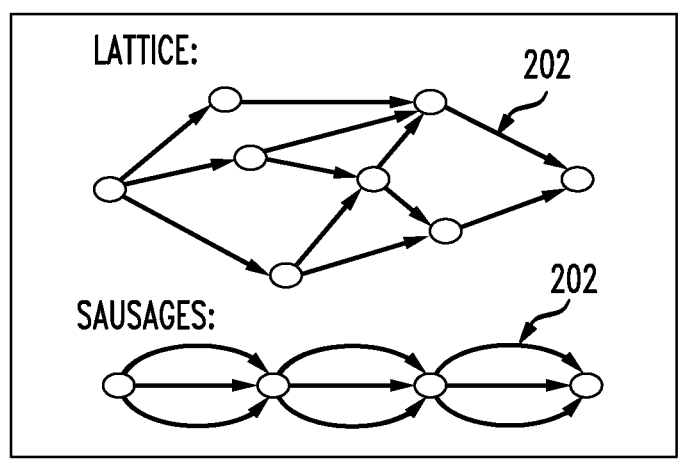
FIG. 2 illustrates the general structure of lattices and sausages.

FIG. 2 illustrates the general structure of lattice 202 and sausage 204. The Mangu et al. algorithm takes as input a word lattice, prunes its low probability links, and computes the posterior probability for each link. It first merges different occurrences of the same word, around the same time interval (intra-word clustering), and sums their posterior probabilities. Then, the Mangu et al. algorithm groups different but competing words that exist around the same time interval and forms confusion sets (inter-word clustering). The sequence of words with the lowest expected word error rate, the consensus hypothesis, is obtained by selecting the word that has the highest posterior probability from each confusion set.

The word posterior probability estimates are used as word confidence scores, which can be interpreted as the probability of being correctly recognized for a word w, $P_{correct}(w)$, and the notation $C(w_1, \ldots, w_n)$ represents the confidence score of the word sequence $w_1, \ldots, w_n$. Different approaches were evaluated to obtain utterance level confidence measures from word confidence scores that are extracted from sausages. A preferred approach is to compute the confidence score of an utterance as the arithmetic mean of the confidence scores of the words that it contains as shown in equation (1):

$$C(w_1, \ldots, w_n) = (1/n)\Sigma_{(i=1 \text{ to } n)} P_{correct}(w_1) \qquad (1)$$

Another approach is to compute the confidence score of an utterance as the product of the confidence scores of the words that it contains as shown in equation (2)

$$C(w_1, \ldots, w_n) = \Pi_{(i=i \text{ to } n)} P_{correct}(w_1)^{(\alpha_1(w_i))} \qquad (2)$$

where $(\alpha_1(w_i))$ is a scaling function. Other methods are also available to compute the confidence score, such as equation (3):

$$C(w_1, \ldots, w_n) = F(P_{correct}(w_1)) \qquad (3)$$

where F can be the geometric mean or the min function. The particular function is not relevant to the present disclosure.

The inventors of the present disclosure performed a series of experiments to verify that the posterior probabilities of the consensus hypothesis can be used to select more informative utterances to transcribe. Utterances from the database of the "How May I Help You?" system for customer care were used. The language models used in all the experiments are tri-gram models based on Variable N-gram Stochastic Automata. See, G. Riccardi, R. Pieraccini, and E. Bocchieri, "Stochastic automata for language modeling," *Computer Speech and Language*, Vol. 10, pp. 265-293 (1996). The acoustic models are sub-word unit-based, with tri-phone context modeling and variable number of gaussians between 4 and 24.

The initial set of transcribed utterances, which is used to train the initial acoustic and language models, consists of 4,000 utterances (70,000 words). An additional set of transcription candidate utterances consists of 37,720 utterances (664,600 words). The test data consists of 2,076 utterances (30,882 words). All utterances are the responses to the greeting prompt class (e.g., "Hello. This is AT&T How May I Help You?")

The inventors use the word posterior probabilities as confidence scores to determine whether they are correctly recognized or not. This is a binary decision. According to this, a word is considered correctly recognized if its posterior probability is higher than some threshold and mis-recognized if not. The computer device computed the word posterior probabilities for the utterances in a test set.

Figure 3:
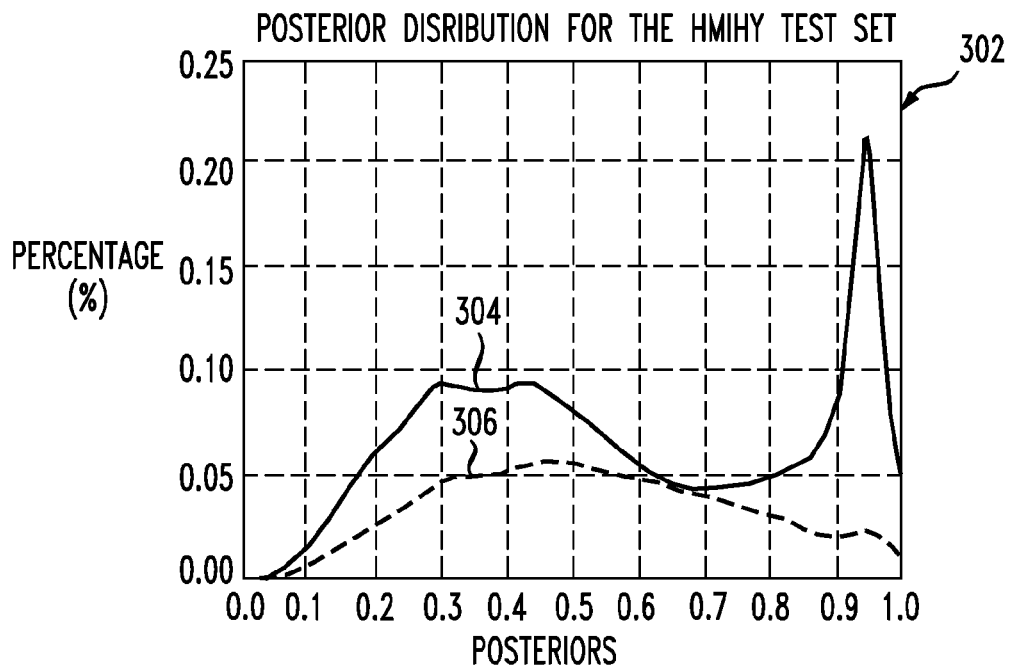
FIG. 3 illustrates the distribution of the posterior probabilities of the words that have been correctly recognized and mis-recognized.

FIG. 3 shows the distribution 302 of the posterior probabilities of the words that have been correctly recognized 306 and mis-recognized 304. The separability between the posterior probability distributions of correctly recognized and mis-recognized words suggests that the posterior probability is a good candidate for a confidence score.

Figure 4:
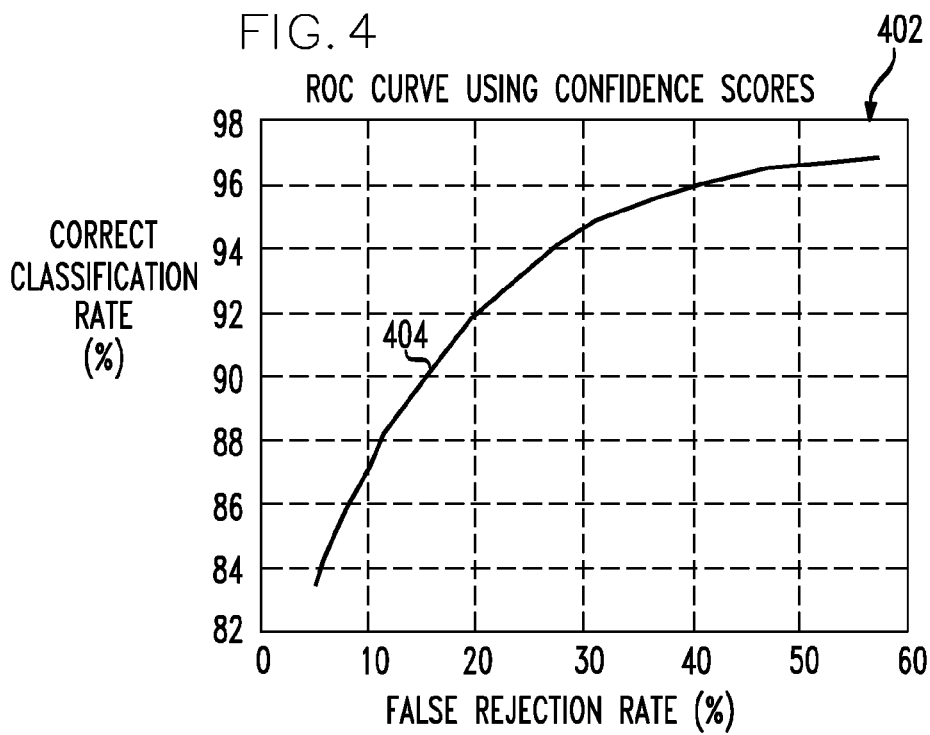
FIG. 4 illustrates a receiver operating characteristic curve of correct classification versus false rejection rates.

FIG. 4 illustrates a graph 402 of the receiver operating characteristic (ROC) curve 404 of correct classification versus false rejection rates, by varying the threshold value, when the test data is classified. The estimation of these confidence scores does not require any training of any type of models (using acoustic or lexical features).

Figure 5A:
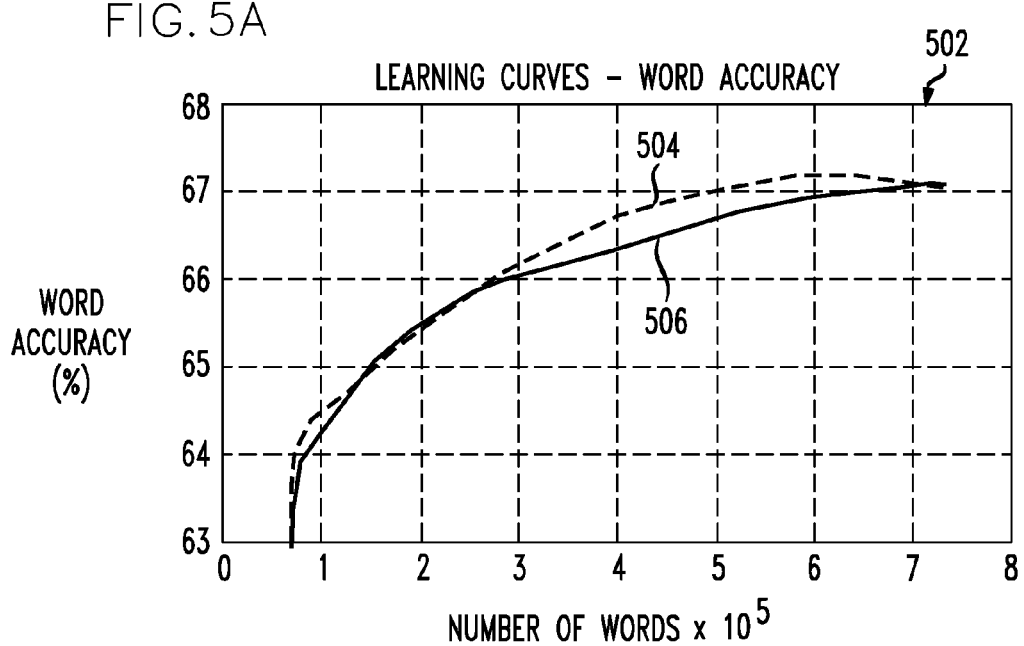
FIG. 5A illustrates a learning curve associated with word accuracy.
Figure 5B:
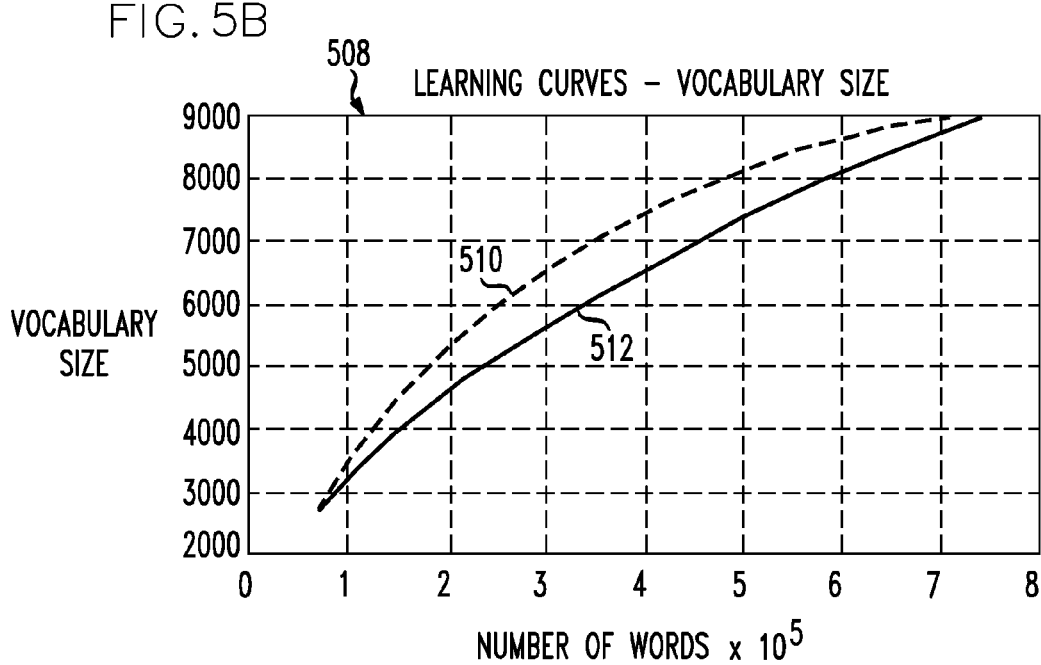
FIG. 5B illustrates a learning curve associated with vocabulary size.

For active learning in ASR, the inventors trained language and acoustic models using the initial set of 4,000 utterances. Using these models, the inventors generated lattices and sausages for additional training data and computed the confidence scores for words and utterances as described above. The inventors incrementally trained language models only, every 4000 utterances (k=4000) (1000 and 2000 utterances at the initial points), and generated learning curves for word accuracy and vocabulary size. FIG. 5A illustrates a graph 502 of the learning curves for word accuracy. Plot 504 represents the mean confidence score and plot 506 is the random sampling. Similarly, FIG. 5B illustrates a graph 508 of the learning curves for vocabulary size with curve 510 representing the mean confidence score and curve 512 representing a random sampling.

The inventors plotted the results using the arithmetic mean of the word confidence scores (that is, F is the mean function in equation (1)), which gave the best results in this case. These curves provide evidence that selective sampling is effective in reducing the need for labeled data (for a given word accuracy). The best performance with random sampling was achieved using all of the training data ($7.3 \times 10^5$). The inventors achieved the same word accuracy (67.1%) with selective sampling and using 27% less data (with $5.3 \times 10^5$ words). Therefore, by selective sampling, it is possible to speed up the learning rate of ASR with respect to the amount of labeled transcriptions.

Described herein are new methods for reducing the amount of labeled training examples by selectively sampling the most informative subset of data for transcription using lattice-based confidence measures. By selective sampling using utterance-level confidence measures, the inventors achieve the same word accuracy results using 27% less data. It is possible to detect utterances that have little new information when added to an initial set of utterances.

Embodiments within the scope of the present disclosure may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or a combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this disclosure. For example, the preferred embodiments of the disclosure may be described with reference to an ASR component within a spoken dialog system. However, the disclosure may have applicability in a variety of environments where ASR may be used. Therefore, the disclosure is not limited to ASR within any particular application. Accordingly, the appended claims and their legal equivalents only should define the disclosure, rather than any specific examples given.

We claim:

1. A method comprising:
   iteratively repeating until a word accuracy converges:
      recognizing untranscribed audio utterances that are candidates for transcription using a trained acoustic model and a trained language model;
      computing confidence scores associated with an accuracy of speech recognition of the untranscribed audio utterances;
      transcribing an audio utterance from the untranscribed audio utterances, the audio utterance having a confidence score in the confidence scores below a threshold, to yield a transcribed utterance; and
      removing the audio utterance, that yielded the transcribed utterance, from a database comprising the untranscribed audio utterances.

2. The method of claim 1, wherein the audio utterances comprises a plurality of audio words.

3. The method of claim 1, further comprising leaving out from consideration for transcription utterances with confidence scores indicating that the untranscribed audio utterances were correctly recognized.

4. The method of claim 1, wherein word posterior probability estimates are used for the confidence scores associated with the untranscribed audio utterances.

5. The method of claim 4, wherein a word is considered to be correctly recognized when an associated posterior probability is higher than a second threshold value.

6. A computer readable storage device having instructions stored which, when executed by a computing device, cause the computing device to perform operations comprising:
  iteratively repeating until a word accuracy converges:
    recognizing untranscribed audio utterances that are candidates for transcription using a trained acoustic model and a trained language model;
    computing confidence scores associated with an accuracy of speech recognition of the untranscribed audio utterances;
    transcribing an audio utterance from the untranscribed audio utterances, the audio utterance having a confidence score in the confidence scores below a threshold, to yield a transcribed utterance; and
    removing the audio utterance, that yielded the transcribed utterance, from a database comprising the untranscribed audio utterances.

7. The computer readable storage device of claim 6, wherein the audio utterances comprises a plurality of audio words.

8. The computer readable storage device of claim 6, the computer readable storage device having additional instructions stored which result in the operations further comprising leaving out from consideration for transcription untranscribed audio utterances with confidence scores indicating that the utterances were correctly recognized.

9. The computer readable storage device of claim 6, wherein word posterior probability estimates are used for the confidence scores associated with the untranscribed audio utterances.

10. The computer readable storage device of claim 9, wherein a word is considered to be correctly recognized when its posterior probability is higher than a second threshold value.

11. A system comprising:
  a processor; and
  a computer-readable storage medium having instructions stored which, when executed by the processor, cause the processor to perform operations comprising:
    recognizing untranscribed audio utterances that are candidates for transcription using a trained acoustic model and a language model;
    computing confidence scores associated with an accuracy of speech recognition of the untranscribed audio utterances;
    transcribing an audio utterance from the untranscribed audio utterances, the audio utterance having a confidence score in the confidence scores below a threshold, to yield a transcribed utterance; and
    removing the audio utterance, that yielded the transcribed utterance, from a database comprising the untranscribed audio utterances.

12. The system of claim 11, wherein the audio utterances comprises a plurality of audio words.

13. The system of claim 11, the computer-readable storage medium having additional instructions stored which result in the operations further comprising leaving out from consideration for transcription untranscribed audio utterances with confidence scores indicating that the utterances were correctly recognized.

14. The system of claim 11, wherein word posterior probability estimates are used for the confidence scores associated with the untranscribed audio utterances.

15. The system of claim 14, wherein a word is considered to be correctly recognized when its posterior probability is higher than a second threshold value.

* * * * *

UNITED STATES PATENT AND TRADEMARK OFFICE
CERTIFICATE OF CORRECTION

PATENT NO. : 8,650,033 B1
APPLICATION NO. : 11/549395
DATED : February 11, 2014
INVENTOR(S) : Allen Louis Gorin, Dilek Z. Hakkani-Tur and Giuseppe Riccardi Page 1 of 1

It is certified that error appears in the above-identified patent and that said Letters Patent is hereby corrected as shown below:

In the Claims

Col. 6, Claim 2, line 62, change "audio utterances" to --audio utterance--

Col. 7, Claim 7, line 26, change "audio utterances" to --audio utterance--

Col. 8, Claim 12, line 22, change "audio utterances" to --audio utterance--

Signed and Sealed this
Seventh Day of April, 2015

Michelle K. Lee
*Director of the United States Patent and Trademark Office*